(12) United States Patent
Wilk et al.

(10) Patent No.: US 6,597,779 B1
(45) Date of Patent: Jul. 22, 2003

(54) METHOD, APPARATUS AND SYSTEM FOR CALL HOLDING

(75) Inventors: Daniel Wilk, Toronto (CA); Moataz Kamel, Toronto (CA); Robert Stratton, Toronto (CA)

(73) Assignee: Soma Networks, Inc., San Francisco, CA (US)

( * ) Notice: Subject to any disclaimer, the term of this patent is extended or adjusted under 35 U.S.C. 154(b) by 248 days.

(21) Appl. No.: 09/722,455

(22) Filed: Nov. 28, 2000

(30) Foreign Application Priority Data

Jun. 2, 2000 (CA) .............................................. 2310187

(51) Int. Cl.[7] ................................................ H04M 3/48
(52) U.S. Cl. ............. 379/210.01; 379/162; 379/208.01; 379/209.01
(58) Field of Search ................................. 379/162, 163, 379/201.01, 208.01, 209.01, 210.01

(56) References Cited

U.S. PATENT DOCUMENTS

| | | | | |
|---|---|---|---|---|
| 5,943,397 A | | 8/1999 | Gabin et al. ............... 379/67.1 |
| 6,031,905 A | * | 2/2000 | Furman et al. ......... 379/215.01 |
| 6,118,861 A | * | 9/2000 | Gutzmann et al. ..... 379/201.01 |
| 6,122,346 A | * | 9/2000 | Grossman .................... 379/163 |
| 6,219,415 B1 | * | 4/2001 | Deutsch et al. ............. 379/162 |
| 6,301,346 B1 | * | 10/2001 | Lee .............................. 379/162 |

\* cited by examiner

Primary Examiner—Harry S. Hong
(74) Attorney, Agent, or Firm—Katten Muchin Zavis Rosenman

(57) ABSTRACT

A method and system for managing a telephony connection on hold to reduce the use of resources within the telephony network and/or to allow the user on hold to place their telephony device into an on-hook state after they have been placed on hold. In two embodiments, a user of a telephony device who has been placed on hold can initiate a Smart Hold whereby their telephony device can be placed in an on-hook state while on hold and the user will be signaled when the call is to be removed from hold. This allows the user to perform other activities while a Smart Hold has been implemented, without the need to keep a telephone handset to their car, for example. The freeing up of local loop resources can also be achieved. In another embodiment, the Smart Hold can be initiated by either party to a connection without requiring cooperation of the other party. In some embodiments, no toll charges or the like will be incurred while the Smart Hold is in effect.

13 Claims, 8 Drawing Sheets

METHOD, APPARATUS AND SYSTEM FOR CALL HOLDING

FIELD OF THE INVENTION

The present invention relates to a system, switch apparatus and method for call holding. More specifically, the present invention relates to a method, switch apparatus and system for managing a connection on hold to reduce the use of resources within the telephone network and/or to allow the user on hold to place their telephony device into an on hook state while on hold and/or to perform other telephony tasks while on hold.

BACKGROUND OF THE INVENTION

It has become increasingly common for users in a telephony network to be placed on hold for relatively long periods of time. For example, connecting to an airline for reservation information or to a software company for technical support information can result in long hold periods where a user is placed on hold while awaiting their turn in the caller queue or while awaiting the person at the other end of the call to locate desired information and/or services. Such long hold periods are generally quite frustrating for users who are forced to continue to listen to supplied background music, advertisements or even silence throughout the hold period. Typical solutions to these frustrations include abandoning the call (by hanging up) or using a speakerphone (assuming the telephone is so equipped) to monitor the status of the call while performing other activities, etc.

In addition to the frustrations of being placed on hold for relatively long periods of time, there can be economic and/or network implications too. For example, in cellular telephone or wireless local loop networks, valuable network resources (i.e. radio bandwidth and/or transmission capacity) are consumed by such calls, even though no important information (i.e.—only the above-mentioned background music, etc.) is being exchanged between the users. Similarly, users of such wireless systems are typically charged for their connection time (airtime) and thus significant expense can be incurred when long hold periods are encountered and similar disadvantages occur with toll (long distance) calls over a landline or wireless system.

Another example of the economic disadvantages of long hold periods, this time to the called party, occurs with "1-800" or other toll-free (to the caller) call systems. Specifically, the callees which provide such systems can incur significant expenses when their call centers are busy and a caller must be placed on hold while queued. In many present circumstances, such callees have discontinued offering such toll-free telephone services to their call centers due to these costs, despite the fact that the lack of such toll-free services can hurt the marketing efforts and/or reputation of the callees.

It is therefore desired to have a system and method which reduces the network, economic and/or caller impact of relatively long hold periods.

SUMMARY OF THE INVENTION

It is an object of the present invention to provide a novel system, switch apparatus and method for call holding which obviates or mitigates at least some of the above-identified disadvantages of the prior art.

According to a first aspect of the present invention, there is provided a method for managing a connection between two telephony devices, comprising the steps of:

(i) a user at a first of said two telephony devices indicating to a first switch to which the first of said two telephony devices is connected to terminate the connection in said first switch to place the connection on hold;

(ii) a user at a second of said two telephony devices indicating to a second switch to which the second of said two telephony devices is connected to implement a doubly-terminated connection in said second switch and said second switch terminating said connection;

(iii) sending a notice from said second switch to said user at said first switch indicating that said connection was placed into a doubly-terminated condition;

(iv) monitoring at said second switch to detect a signal from said user at said first switch indicating a desire to reestablish said connection;

(v) said second switch notifying said user at said second telephony device that it is desired to reestablish said connection;

(vi) if said second telephony device is placed in an off-hook state within a predefined time period, reestablishing said connection and ending said connection if said predefined time period is exceeded before said second telephony device is place in an off-hook condition.

According to another aspect of the present invention, there is provided a method for managing a connection between two telephony devices, comprising the steps of:

(i) a user at a first of said two telephony devices indicating to a first switch to which the first of said two telephony devices is connected to implement a Smart Hold for the connection;

(ii) said first switch indicating to said second telephony device that a Smart Hold will be implemented for said connection;

(iii) said first switch acquiring reconnection information from said second switch and creating a Hold Applet containing said reconnection information;

(iv) ending said connection between said first and second telephony device;

(v) said Hold Applet monitoring said first telephony device to determine when it is desired to reconnect to said second telephony device;

(vi) upon determining that it is desired to reconnect, said Hold Applet notifying a user of said second telephony device that it is desired to reestablish a connection; and (vii) upon said second user confirming that a connection is to be reestablished, reestablishing a connection in accordance with said reconnection information.

According to yet another aspect of the present invention, there is provided a switch apparatus for a switched telephone network for implementing a doubly terminated hold between a first and a second user, comprising:

means for receiving a request for a Smart Hold from said second user on hold;

means for terminating an existing connection to said first user within said switch apparatus to obtain a doubly terminated connection;

means to advise said first user that said connection has been doubly terminated;

means to receive a reconnect request from said first user;

means to advise said second user of the receipt of a reconnection request; and means to monitor said second user and to reconnect said first user and said second user upon an confirmation to do so being received by said switch apparatus with in a predefined time period and to end said connection if said confirmation is not received within said time period.

According to yet another aspect of the present invention, there is provided telecommunication system comprising:

a plurality of user telephony devices;

at least two switches operable to create connections between said user telephony devices, said switches operable to:
(i) terminate a connection to place the connection on hold in response to a request by a first connected user;
(ii) receive a request from a second connected user to implement a Smart Hold and to terminate said connection to achieve said Smart Hold;
(iii) advise said first connected user that said connection has been placed on Smart Hold;
(iv) receive a request from said first user to reconnect to said second user;
(v) advice said second user that a reconnection request has been received from said first user; and
(vi) reconnect said first and second user if said first user agrees within a predefined time period or end said connection if said predefined time period is exceeded before said agreement is received from said first user.

The present invention provides a method, apparatus and system for managing a telephone call on hold to reduce the use of resources within the telephone network and/or to allow the user on hold to place their telephony device into an on-hook state after they have been placed on hold. In two embodiments, a user of a telephony device who has been placed on hold can initiate a Smart Hold whereby their telephony device can be placed in an on-hook state while on hold and the user will be signaled when the call is to be removed from hold. This allows the user to perform other activities while a Smart Hold has been implemented, without the need to keep a telephone handset to their ear, for example. The freeing up of the local loop, or other resources of the user, can also be achieved. In another embodiment, the Smart Hold can be initiated by either party to a connection without requiring cooperation of the other party. In another embodiment, no connection is maintained while the Smart Hold is in effect and thus no toll charges or the like need be incurred while the Smart Hold is in effect.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
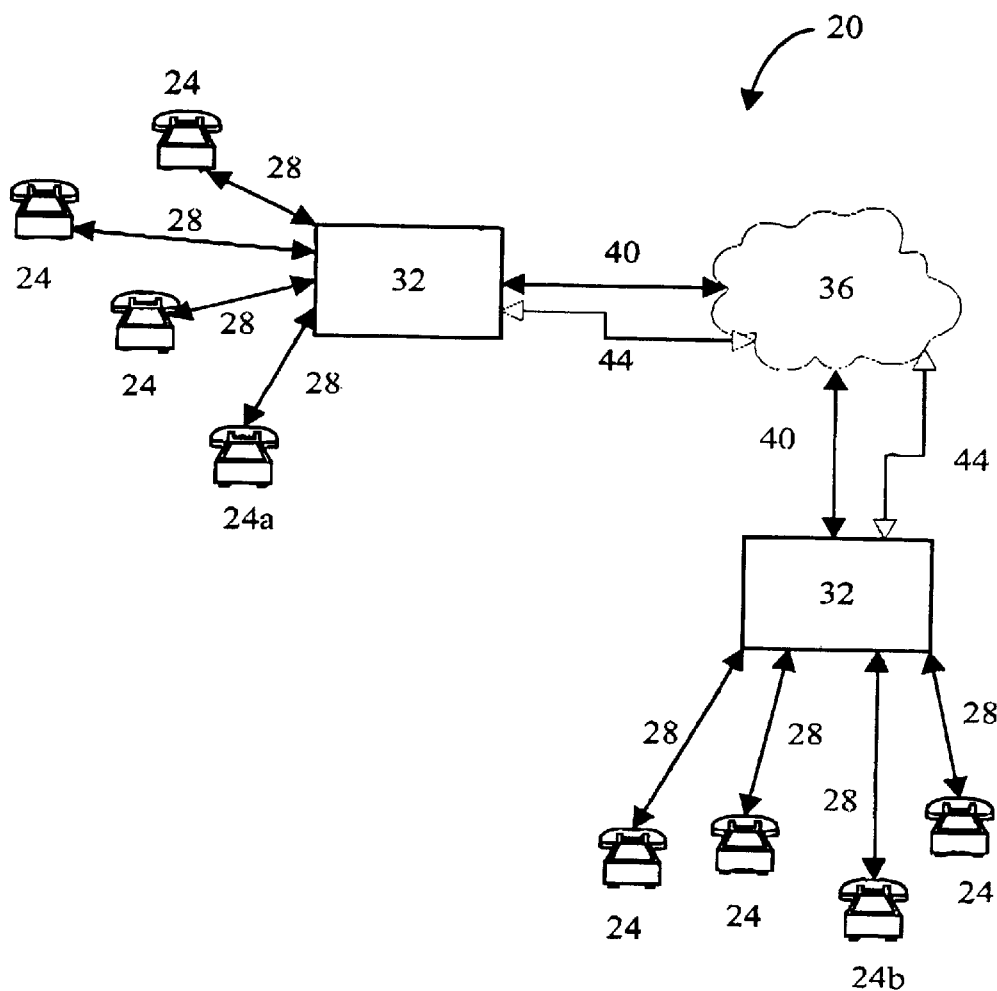
FIG. 1 shows a prior art public switched telephone network.

A conventional public switched telephone network (PSTN) is indicated generally at 20 in FIG. 1. PSTN 20 includes a plurality of telephony devices 24, such as telephones or facsimile machines, which are connected by a local loop 28 to a switch 32. Each switch 32 is connected by one or more trunk lines 40 to the balance 36 of the PSTN. In addition to trunk lines 40, each switch 32 is typically provided with a signaling channel 44 which is used to transmit control signals (such as SS7 signals) between switches 32.

Figure 2:
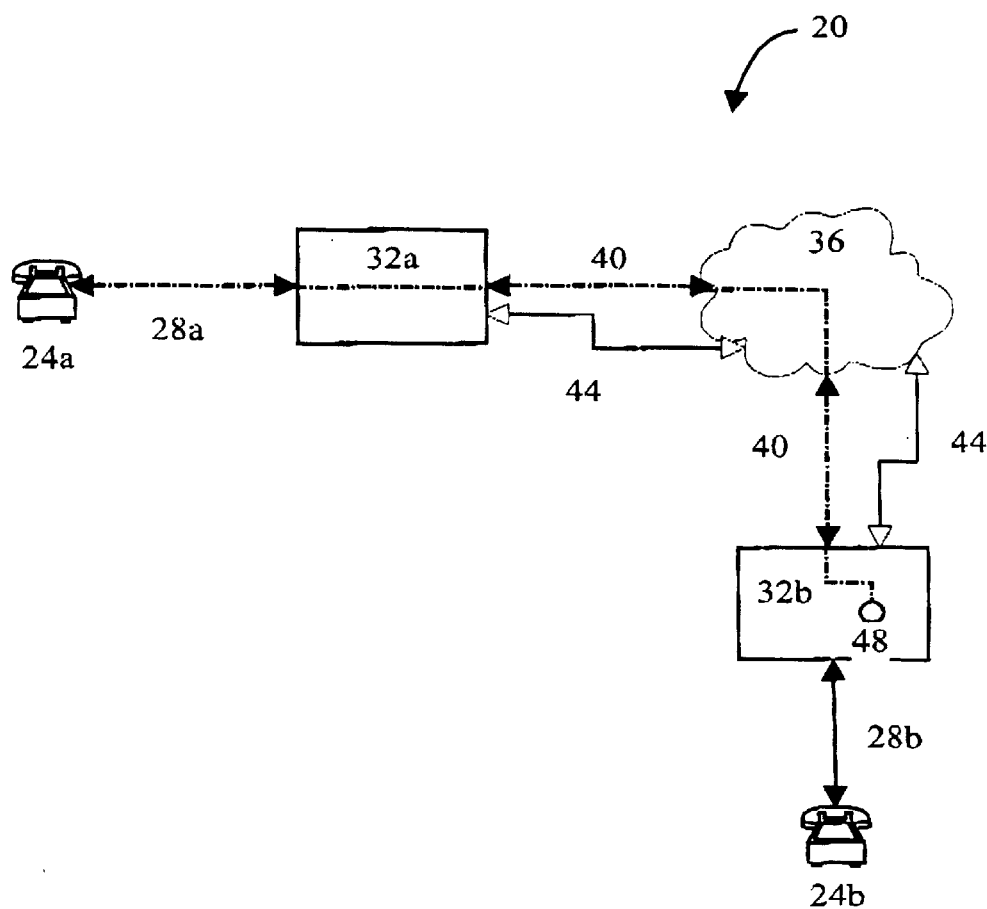
FIG. 2 shows a prior art telephone connection which has been placed on hold.

As shown schematically in FIG. 2, in PSTN 20, when a telephone call between a user of telephony device 24a and a user of telephony device 24b, is placed on hold by the user of telephony device 24b, the connection (shown in dashed line) between the two telephony devices 24 is maintained from the user device 24a placed on hold (the "Holdee") to the switch 32b of the device 24b initiating the hold (the "Holdor"). The connection is terminated at 48 within switch 32b which allows the Holdor at telephony device 24b to perform other tasks with switch 32b, such as switching to another, new, connection which has been announced via a "call waiting" feature implemented at switch 32b, etc.

As used herein, the term "terminated" is not intended to imply an end, but instead is intended to have the connection-based meaning of any suitable mechanism or process for maintaining a connection, or the information to re-establish the connection, when the connection is removed from a local loop. Termination can include electrical means, such as applying a suitable impedance across a telephone line, or logical means such as creating ally needed control packets, switch signals, etc. to maintain the connection in a packet telephony system.

If the connection between the Holdee at telephony device 24a and the Holdor at telephony device 24b is a long distance (toll) call, the toll charges for the complete connection are incurred for the entire duration of the connection, including the period of the call wherein the Holdee was on hold. Further, even for non-toll (local) calls valuable network resources, such as communication capacity on trunks 40 and other equipment in the balance 36 of PSTN 20, are utilized for the entire duration of the connection, even the periods when the Holdee at telephony device 24a is on bold. In circumstances wherein local loop 28a is implemented via a shared link, such as a radio connection (e.g.—in cellular or wireless local loop systems), the transmission capacity (radio bandwidth, time slots, code space, etc., in the case of a multiple access radio link) available to implement local loop 28a is valuable and limited and yet it is occupied by the Holdee at telephony device 24a for the entire duration of the connection.

Figure 3:
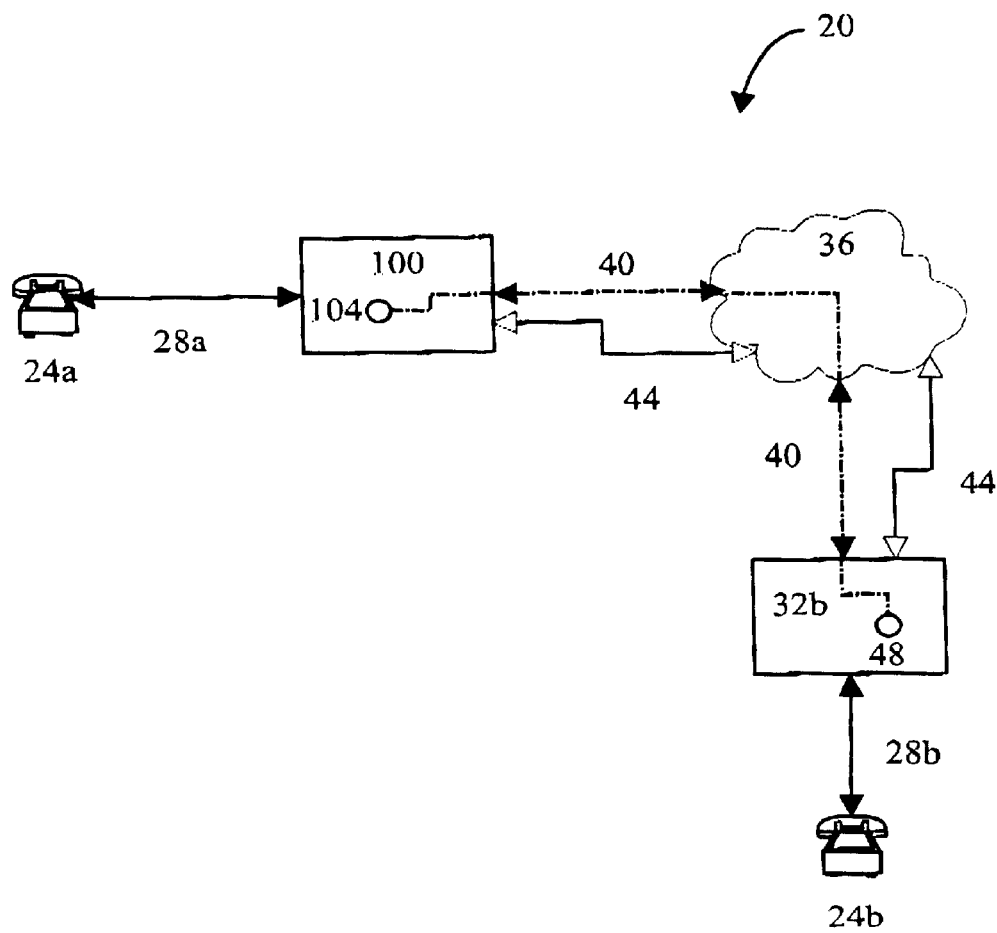
FIG. 3 shows a Smart Hold in accordance with a first embodiment of the present invention.

FIG. 3 shows a first embodiment of the present invention. In FIG. 3 a novel switch 100, constructed in accordance with an embodiment of the present invention, is employed. Switch 100 is connected to a plurality of telephony device. (only device 24a being shown connected to switch 100 in the Figure, for clarity) by local loops 28 and to balance 36 of the PSTN by a trunk 40 and a signaling channel 44 in the conventional manner.

Switch 100 allows local loop 28a to be freed for other use while a user at telephony device 24a is on hold. Specifically, when telephony device 24a is placed on hold, the connection can be terminated at 104 within switch 100, in addition to the conventional termination 48 associated with a hold, to yield what the present inventors refer to as a doubly terminated hold, or Smart Hold. In such a case, switch 100 will continue to operate to receive signaling information relating to the connection, and will also monitor the connection for in-band signals, such as the reconnect signal discussed below.

Figure 4:
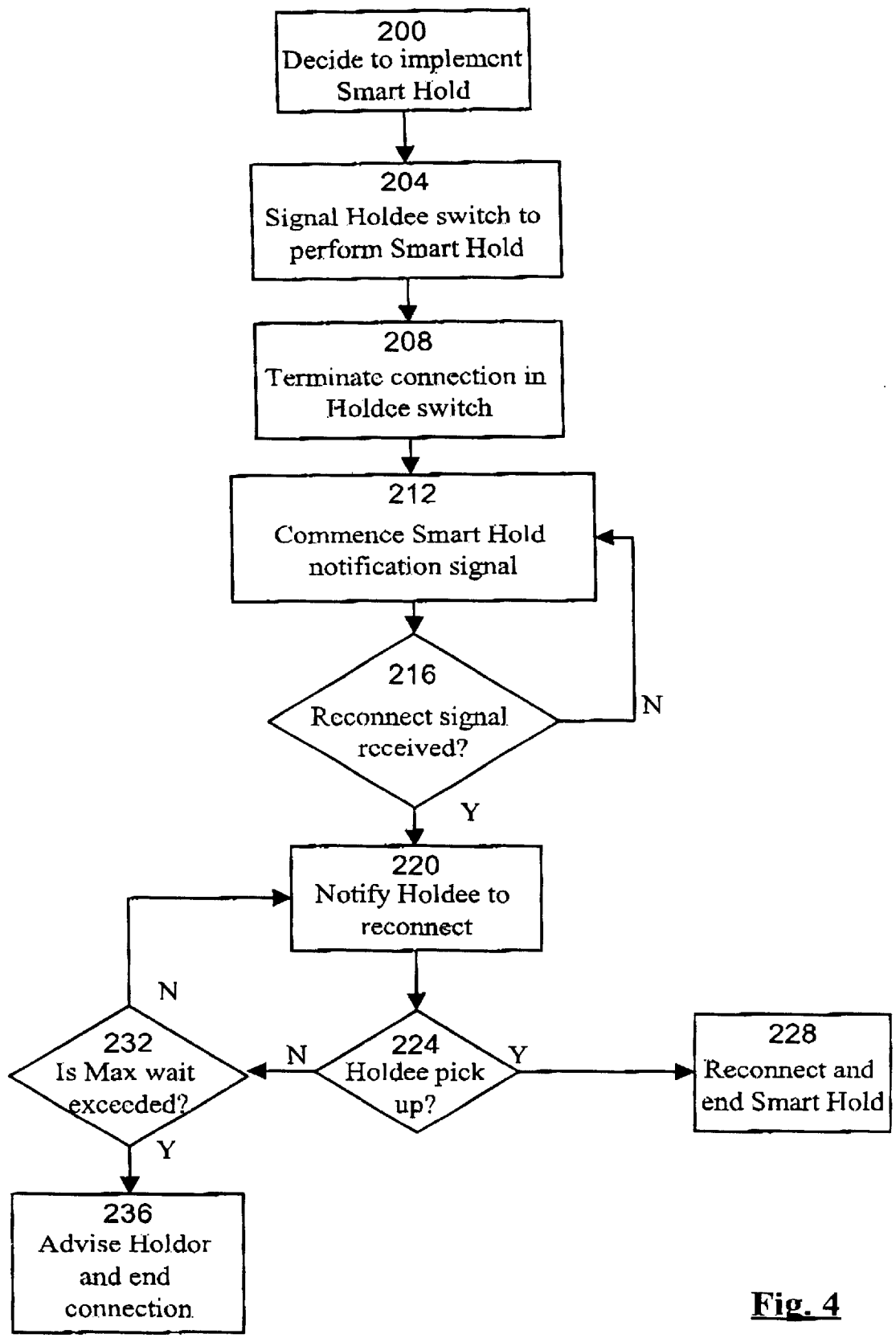
FIG. 4 shows a flowchart of the method of implementing the Smart Hold of FIG. 3.

FIG. 4 shows a flow chart of the process of implementing a Smart Hold and freeing local Loop 28a after a conventional hold has been initiated by the user of telephony device 24b (the "Holdor"), placing the user of telephony device 24a (the "Holdee") on hold. At step 200 the Holdee now on conventional hold, decides to implement a Smart Hold. At step 204, telephony device 24a signals switch 100 that a Smart Hold is desired. The manner by which this signal is performed is not particularly limited and can, for example, be implemented with a conventional "Flash" sequence, such as Flash "*74" entered by the Holdee on telephony device 24a. At step 208, the connection is terminated at 104 within switch 100 and a signal is provided to telephony device 24a that the Smart Hold is in place. The signal provided can be any suitable signal which can be perceived by the Holdee, include a tone (a fast busy tone for example) or prerecorded voice message. Once the signal is received at telephony device 24a, it can be placed in the on-look (hung up) condition and the Holdee can perform other tasks or even leave the immediate vicinity of telephony device 24a.

At step 212, a Smart Hold notification signal is next commenced. The notification signal can be any suitable signal indicating to the Holdor that a Smart Hold is in operation, such as a stuttered dial tone or a prerecorded message playing, on a repeating basis, in-band to telephony device 24b. If a prerecorded message is employed, this message informs the Holdor that a Smart Hold has been initiated and that the Holdor can reconnect to the Holdee by sending a defined reconnect signal. This reconnect signal can be any suitable signal to switch 100, such as pressing the "one" key on the dialing pad to generate the appropriate DTMF tones are transmitted in band to switch 100. At step 216, switch 100 monitors the connection to switch 32b for the appropriate reconnect signal from the Holdor. If the signal is not received at step 216, the reconnect message is played again at step 212.

If the signal is received at step 216, the process continues at step 220 where a notification is provided to the Holdee to go off hook again to reconnect. The notification provided to the Holdee can be any suitable notification, such as a distinctive fast ring of telephony device 24a or any other suitable notification as will occur to those of skill in the art. After the notification is performed in step 220, a check is performed at step 224 to determine if telephony device 24a goes off hook. If an off hook condition is detected at step 224, telephony devices 24a and 24b are reconnected and the Smart Hold is completed at step 228.

If an off hook condition is not detected at step 224, a check is made at step 232 as to whether a predefined Maximum Wait time has been exceeded. This Maximum Wait time is employed to ensure that the Smart Hold is not continued indefinitely if the Holdee is not available to reconnect to. In a typical case, the Maximum Wait time may be 25 seconds, and runs from the point where switch 100 receives the reconnect signal from the second user, although longer or shorter times can be employed if desired. If the Maximum Wait time is exceeded, i.e.—the Holdee has not placed telephony device 24a in an off hook condition within the defined time, a notification is sent to the Holdor to indicate that the Holdee is no longer available for the call and the Smart Hold is ended, clearing the connection. The actual notification sent to the Holdor can be a prerecorded voice message, a predefined tone signal—such as a "fast busy" message, or any other suitable notification as will occur to those of skill in the art. If, at step 232, the Maximum Wait time has not been exceeded, the process returns to step 220 and again sends a notification to the Holdee.

While the method of FIG. 4 shows a loop from step 216 to step 212 and through steps 220, 224 and 232, for clarity, it should be apparent to those skill in the art that event-driven programming techniques can be employed, rather than the loop structures, if desired. Similarly, the methods of FIG. 7 and FIGS. 8a and 8b (described below) employ loop structures which can be replaced with event driven programming techniques if desired.

A simple example of the use of the Smart Hold of FIG. 4 can be when a first user at telephony device 24a calls an airline reservation system at telephony device 24b and is placed on hold. In such a case, the Holdee can activate a Smart Hold, by providing a Flash signal and numeric selection, such is Flash "*74". Upon receiving the "*74" sequence, switch 100 will connect the connection to termination 104 and will commence playing a Smart Hold notification signal which advises the Holdor (the airline reservation system) that a Smart Hold has been placed on the connection and, if the notification is a recorded message, that the Holdor at telephony device 24b need only press the "one" key (or make any other suitable user input as may be desired by the implementer of the Smart Hold) on the keypad of telephony device 24b to reconnect. This notification is provided to telephony device 24b until the call reaches the front of the caller queue at the airline. At this point, when a human operator connects to telephony device 24b placing it in an off hook state, the human operator bears the Smart Hold notification signal. The human operator then presses the appropriate key, such as the "one" key and switch 100 sends a reconnect signal to telephony device 24a and the Holdee responds by picking up the handset of telephony device 24a to complete the reconnection and end the Smart Hold.

As will be apparent, this embodiment of the Smart Hold allows the Holdee to perform other activities while they are in a bold period, without requiring them to continue to listen at the handset of telephony device 24a. Also, the Smart Hold allows local loop 28a to the Holdee to be freed up, which can be important when local loop 28a is implemented with a shared resource, such as a radio link in a WLL or cellular telephone system.

If desired, switch 100 can change the status of telephony device 24a such that any other connections attempted to the Holdee are refused, i.e.—telephony device 24a appears "busy", while the Smart Hold is in place. Also, switch 100 can provide a reminder (such as a stuttered dial tone) to telephony device 24a so that a Holdee does not inadvertently make another call after they have implemented a Smart Hold. If the Holdee does make another call after implementing a Smart Hold, switch 100 can be configured to terminate the existing Smart Hold, which has the effect as if the Holdee had hung up in a conventional hold, or to maintain the Smart Hold and to provide the reconnect signal to the Holdee in a suitable manner, such as by sending the Holdee a Call Waiting or similar tone.

The embodiment of the present invention discussed above with reference to FIGS. 3 and 4 only requires that the switch to which the Holdee is attached be able to implement a Smart Hold. Thus, this embodiment is compatible with normal PSTN operation where the Holdor is connected through a conventional PSTN switch 32 that does not directly support Smart Holds. However, when both users (telephony device 24a and telephony device 24b) are connected to a switch 100 or switches 100 which can implement a Smart Hold, additional features and modes of operation are available.

Figure 5:
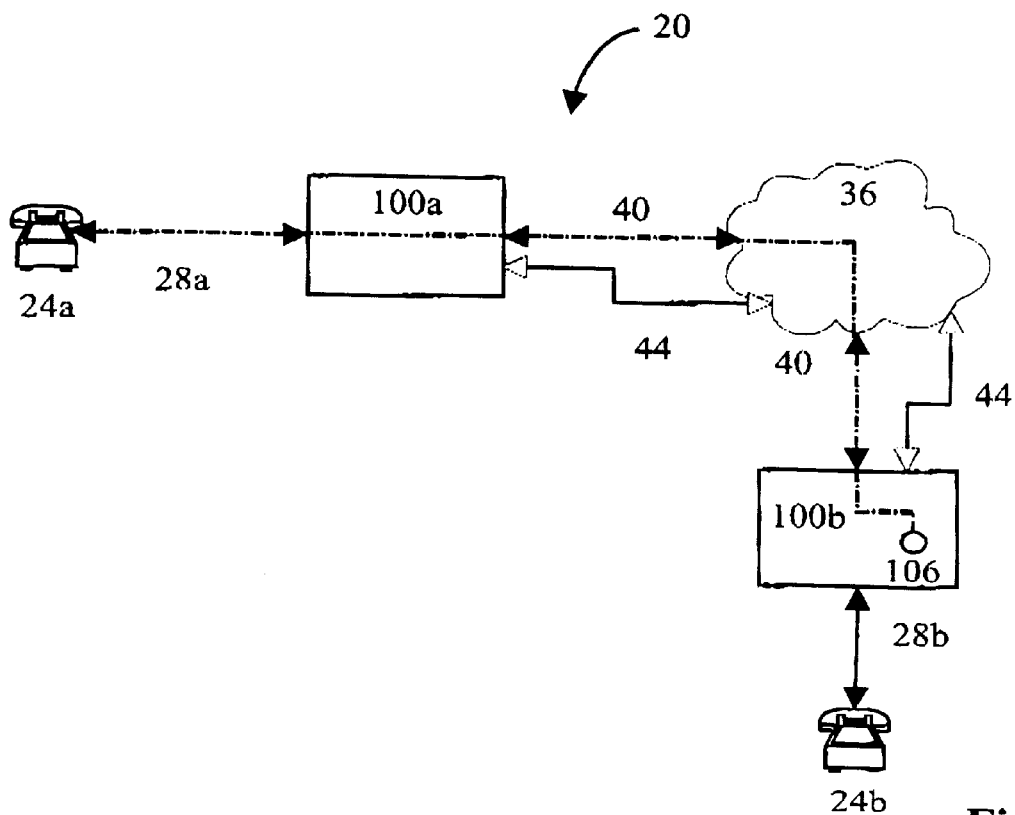
FIG. 5 shows the first step of a Smart Hold in accordance with a second embodiment of the present invention.
Figure 6:
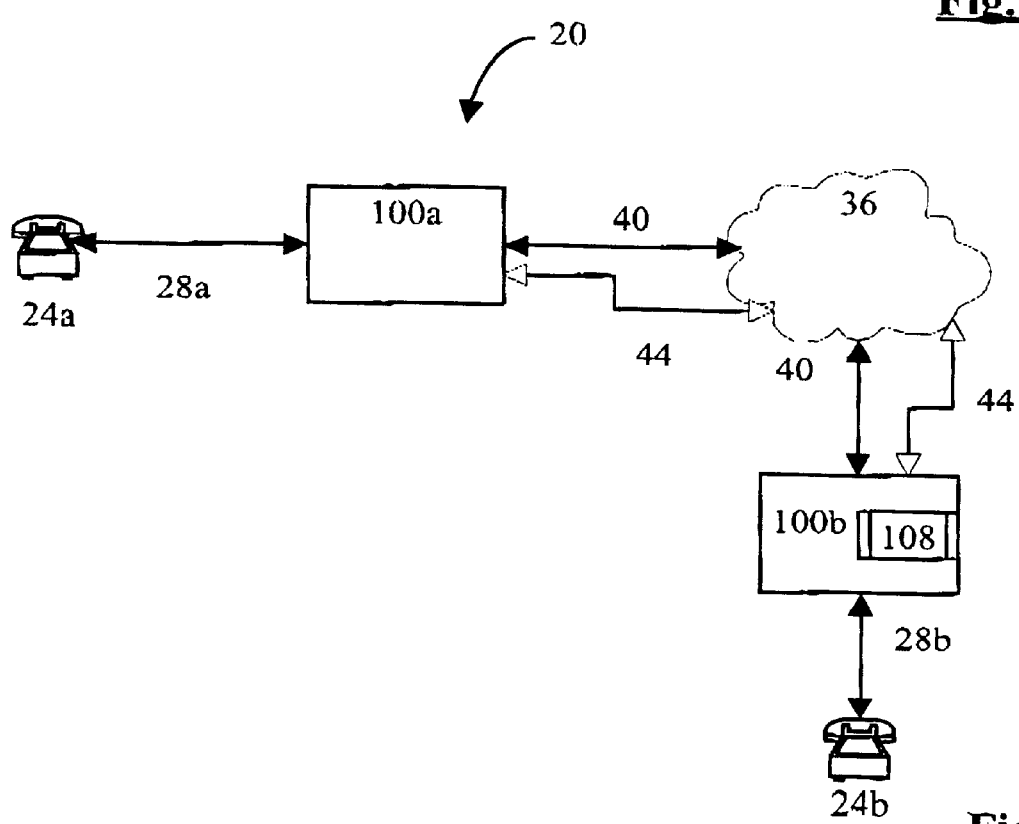
FIG. 6 shows the implemented Smart Hold of FIG. 5.

FIGS. 5 and 6 show another embodiment of the present invention wherein a hold is implemented between users at first and second telephony devices 24a and 24b which are each connected to a respective Smart Hold-enabled switch 100a, 100b in accordance with the present invention. In this embodiment, each switch 100 is operable to detect if the other switch 100 in the connection is Smart Hold-enabled. This determination can be performed when the connection is first established, or when it is desired to implement a Smart Hold or at another suitable time prior to implementing the Smart Hold, as will occur to those of skill in the art. The manner of determining whether a switch is a conventional PSTN switch 32 or a Smart Hold-enabled switch 100 can be performed in a variety of manners, such as by extending the SS7 command set to include such a query and appropriate response, exchanging in-band or out-of-band signals between the switches 100 or, the determination can be implicit where both users are connected to the same switch 100 or where it can be recognized (from the exchanges, etc.) that the switches are located in a portion or portions of the PSTN where the switches have been upgraded to Smart Hold-enabled switches 100, etc.

When a first user (the Holdee) at telephony device 24a is placed on hold by a second user (the Holdor) at telephony device 24b in the conventional manner, the connection is terminated within switch 100b at 106, again in the conventional manner. If desired, the Holdee can activate a Smart Hold as described above by, for example, sending a Flash sequence, such as Flash "*74". In this embodiment, assuming that a suitable determination has been made that both switches are Smart Hold-enabled, instead of terminating the connection within switch 100a to obtain a doubly terminated connection, as shown in FIG. 3, switch 100a signals switch 100b that a Smart Hold is to be implemented and the information required to re-establish the connection is forwarded to switch 100b. Switch 100b then creates a Hold Applet 108 which contains the information required to recreate the connection and the connection is ended, as shown in FIG. 6.

Hold Applet 108 executes on switch 100b and generates any necessary outputs for telephony device 24b, such as signals for hold indicator lights etc., or ensures such outputs are generated, and monitors telephony device 24b for an off-hook or other suitable indication that the Holdor wishes to restore the connection from the Smart Hold. When such an indication is received, Hold Applet 108 instructs switch 100b to reestablish the connection to telephony device 24a, using the information stored in Hold Applet 108. Switch 100b then signals switch 100a to reestablish the connection and after the connection to switch 100a is completed, switch 100a signals telephony device 24a to have the Holdee pick up the handset or otherwise return to an off hook state. This signal can he a fast ring or other distinctive ring or any other suitable signal to the Holdee.

In a present embodiment of the invention, Hold Applet 108 is implemented in the Java programming language and switch 100b is a soft switch with the capability of executing Java applets. As will be apparent to those of skill in the art the present invention is not limited to implementation of Hold Applets in Java and other implementations, such as implementations wherein switch 100b maintains a database of information for Smart Hold connections, etc. can be implemented without departing from the invention. It will also be apparent to those of skill in the art that switch 100b need not be a soft switch, and a properly augmented conventional switch can be employed instead.

Figure 7:
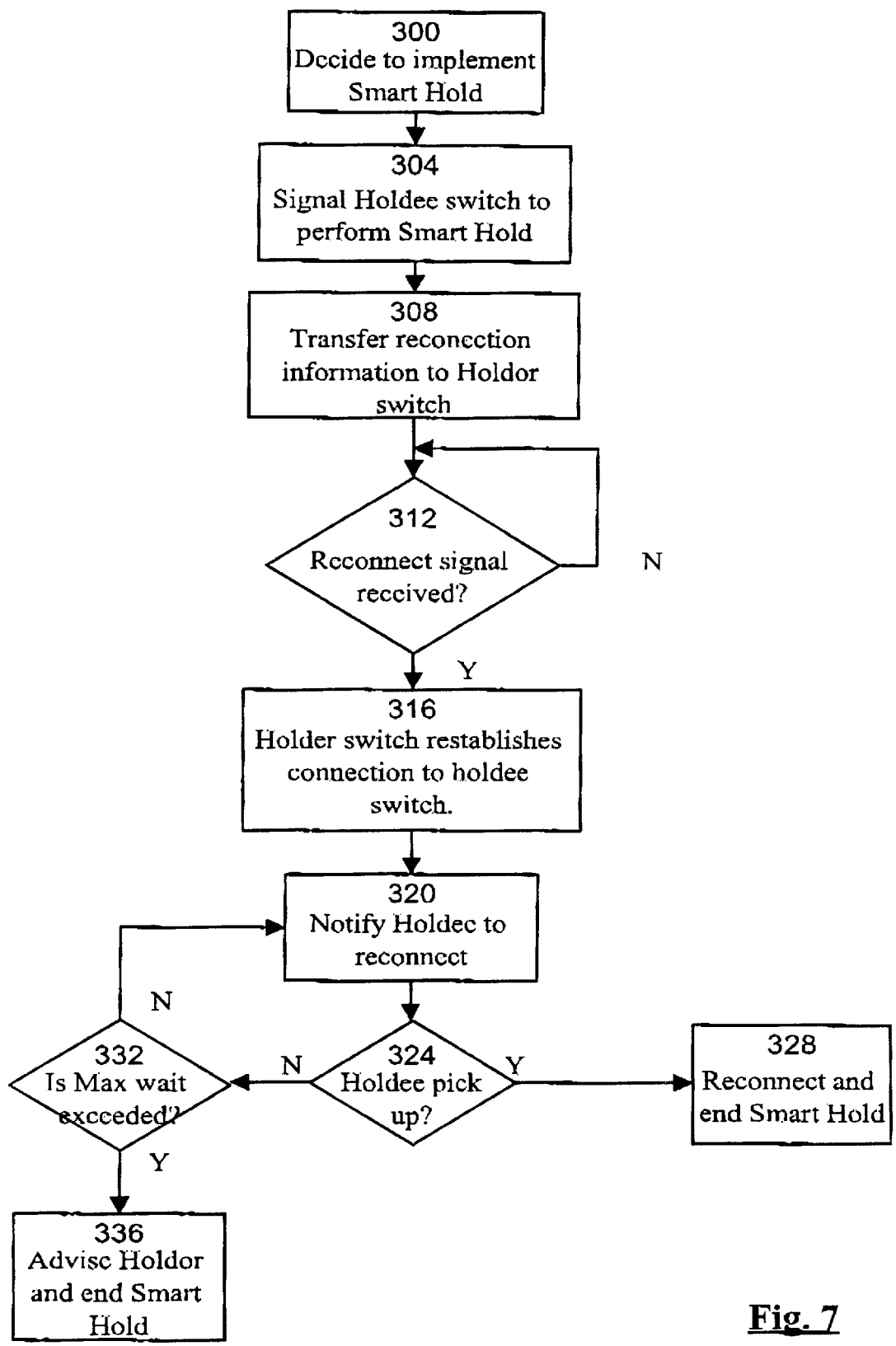
FIG. 7 shows a flowchart of the method of implementing the Smart Hold of FIGS. 5 and 6.

FIG. 7 shows a flowchart of the process of implementing the Smart Hold discussed above with reference to FIGS. 5 and 6. The process commences at step 300 where a Holdee, on a conventional hold, decides to implement a Smart Hold. At step 304 the Holdee signals the switch 100a to which he is attached that he wishes to initiate a Smart Hold. The Holdee switch, after determining that the Holdor switch 100b is a Smart Hold-enabled switch (if the Holdor switch 100b is not Smart Hold-enabled, the process of FIG. 4 will be performed instead) sends a signal to the Holdor switch 100b to initiate a Smart Hold along with the information required to reconnect the call. The Holdor switch 100b then creates a Hold Applet 108 and ends the connection.

At step 312, Hold Applet 108 waits for a reconnect request to be received from the Holdor. Once a reconnect request is received, which can be received in any suitable manner such as telephony device 24b going off hook, the process continues at step 316 where Holdor switch 100b reestablishes a connection to the Holdee switch 100a, in accordance with the reconnection information stored in Hold Applet 108 and instructs Holdee switch 100a to notify the Holdee to reconnect at step 320. As before, this notification can be a fast ring or other distinctive ring of telephony device 24a.

At step 324 a determination is made as to whether the Holdee has picked up (placed in an off hook state) telephony device 24a. If the Holdee has picked up, the Holdee is reconnected to the Holdor and the Smart Hold is ended at step 328. If, at step 324, it is determined that the Holdee has not picked up, a determination is made at step 332 as to whether a preset Maximum Wait time has been exceeded. If the Maximum Wait time has been exceeded without the Holdee placing telephony device 24a into an off hook state, then the Holdor is advised that the Holdee is no longer available and the connection and the Smart Hold is ended at step 336. If, at step 332, it is determined that the Maximum Wait time has not been exceeded, the process again notifies the Holdee at step 320.

As before, if desired, switch 100a can change the status of telephony device 24a such that any other connections attempted to the Holdee arc refused, i.e.—telephony device 24a appears "busy", while the Smart Hold is in place. Also, switch 100a can provide a reminder (such as a stuttered dial tone) to telephony device 24a so that a Holdee does not inadvertently make another call after they have implemented a Smart Hold. If the Holdee does make another call after implementing a Smart Hold, switch 100a can be configured to signal Hold Applet 108 in switch 100b to terminate the existing Smart Hold, which has the effect as if the Holdee had hung up in a conventional hold, or to maintain the Smart Hold and to provide the reconnect signal to the Holdee in a suitable manner, such as by sending the Holdee a Call Waiting or similar tone.

Figure 8A:
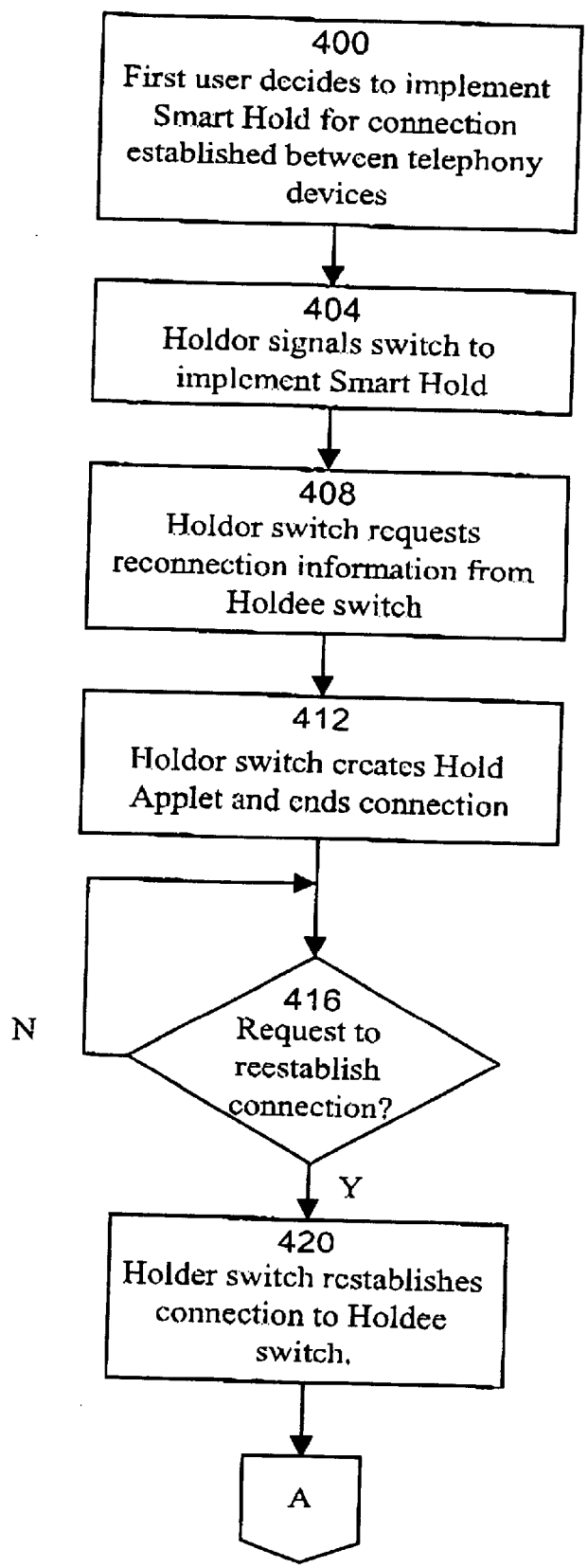
FIGS. 8a and 8b shows a flowchart of another method of implementing the Smart Hold of FIG. 6.
Figure 8B:
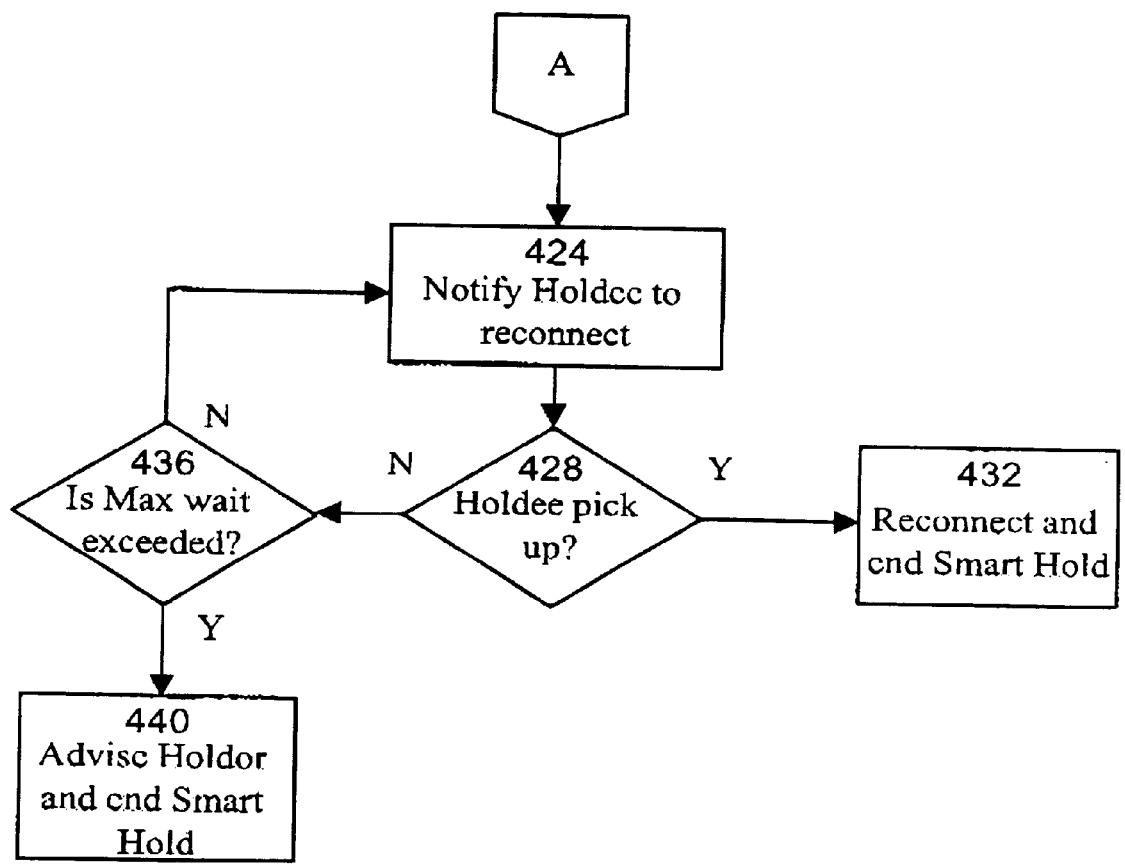

FIGS. 8a and 8b show a flowchart of another embodiment of the present invention wherein a Smart Hold can be directly established by the Holdor, without requiring active participation of the Holdee. The following discussion references both FIGS. 6 and FIGS. 8a and 8b and it is assumed that both switches 100a and 100b are constructed in accordance with the present invention and are Smart Hold enabled. This embodiment commences at step 400 where a first user (at telephony device 24b) of a connection established to a second user (at telephony device 24a) decides to implement a Smart Hold. This first user thus becomes the Holdor and the second user will become the Holdee.

As should be apparent to those of skill in the art, the Holdor can be the user who initiated the connection or the user who received the connection. At stop 404 the Holdor signals switch 100b to implement a Smart Hold and switch 100b then, at step 408, requests switch 100a, either through trunk 40 or through signaling channel 44, to provide information necessary to reestablish the connection. When the reconnection information is received by switch 100b, it then creates a Hold Applet 108 and ends the connection between the users at step 412.

At step 416, a check is performed by Hold Applet 108 to determine if the Holdor wishes to reestablish the connection. Again, while a loop structure is shown for clarity, step 416 can be implemented in an event driven manner.

If the Holdor has requested the connection to be reestablished, switch 100b reestablishes a connection to switch 100a, in accordance with the reconnection information stored in Hold Applet 108 at step 420. At step 424 switch 100b instructs switch 100a to notify the Holdee to reconnect. As before, the notification can be a fast ring or other distinctive ring of telephony device 24a or other suitable signal.

At step 428 a determination is made as to whether the Holdee has picked up (placed in an off hook state) telephony device 24a. If the Holdee has picked up, the Holdee is reconnected to the Holdor and the Smart Hold is ended at step 432. If, at step 428, it is determined that the Holdee has not picked up, a determination is made at step 436 as to whether a preset Maximum Wait time has been exceeded. If the Maximum Wait time has been exceeded without the Holdee placing telephony device 24a into an off hook state, then the Holdor is advised that the Holdee is no longer available and the connection and the Smart Hold is ended at step 440. If, at step 436, it is determined that the Maximum Wait time has not been exceeded, the process again notifies the Holdee at step 424.

If switch 100a is not Smart Hold enabled, the method disclosed above can still be successfully performed as long as switch 100a can provide the necessary reconnection information require to create Hold Applet 108. At a minimum, this information can be a subset of the Caller ID information sent by switch 100a at the setup of the connection which can be maintained by switch 100b. Thus, many switches 100a will be compatible with, and enable, this method even though they are not otherwise Smart Hold enabled.

In addition to the convenience to the Holdee which the present invention provides, in the embodiments of FIGS. 7 and 8a and 8b, the present invention can provide economic advantages when used by call centers, or the like, offering 1-800 or other toll free services. Specifically, as no connection is maintained while the Smart Hold is operating (instead Hold Applet 108 operates to have the connection reestablished), no toll expenses are incurred by the Holdor user while the Smart Hold is operating. In the embodiment of FIG. 7, Holdees connecting to a Holdor at telephony device 24b (which in this example can be a call center PBX system) can be encouraged to employ a Smart Hold to reduce the toll expenses of the Holdor. In the embodiment of FIGS. 8A and 8b, the Holdor can initiate the Smart Hold to reduce toll charges, and preferably notifies the Holdee of when to expect the Smart Hold to end, i.e.—a notice such as, "We are placing you on Smart Hold as we do not expect to be able to serve you immediately. We expect to reconnect to you in about ten minutes", can be provided to the Holdee prior to implementing the Smart Hold.

As will be apparent to those of skill in the art, additional enhancements can be added to the methods of FIG. 7 or FIGS. 8a and 8b. For example, when the Smart Hold is initiated, the Holdee can be offered the choice of inputting another number to have the connection to reestablished to, once the Smart Hold is ended. This information will be placed in Hold Applet 108 instead of, or in addition to, the information required to reestablish the original connection. This allows, for example, a Holdee at their office to input the telephone number for their cellular telephone for the call to be reconnected to when the Smart Hold is terminated. In this manner, the Holdee can move about with their cellular phone and the connection will be reestablished to the cellular telephone, even though the call originated on a desk telephone, when the Holdor reconnects.

Similar advantages can be obtained in situations wherein one or both users are mobile (cellular) users. In such a case the present invention can reduce the air time used in the mobile system when users are on hold and thus can free up transmission capacity within the mobile system which would otherwise be occupied by users on Hold and/or can provide a reduction in air time expenses to users. As will be apparent to those of skill in the art, in such cases the mobile network is responsible for tracking the location of the mobile user(s) to determine the base station, or base stations, which will service the mobile user(s) once a connection is re-established and this can be accomplished in the normal manner of such systems.

The above-described embodiments of the invention are intended to be examples of the present invention and alterations and modifications may be effected thereto, by those of skill in the art, without departing from the scope of the invention which is defined solely by the claims appended hereto.

We claim:

1. A method for managing a connection between two telephony devices, comprising the steps of:
   (i) a user at a first of said two telephony devices indicating to a first switch to which the first of said two telephony devices is connected to terminate the connection in said first switch to place the connection on hold;
   (ii) a user at a second of said two telephony devices indicating to a second switch to which the second of said two telephony devices is connected to implement a doubly-terminated connection in said second switch and said second switch terminating said connection;
   (iii) sending a notice from said second switch to said user at said first switch indicating that said connection was placed into a doubly-terminated condition;
   (iv) said second switch indicating that said second telephony device is off-hook to any incoming call not originating from said first of said two telephony devices;
   (v) monitoring at said second switch to detect a signal from said user at said first switch indicating a desire to reestablish said connection;
   (vi) said second switch notifying said user at said second telephony device that it is desired to reestablish said connection;
   (vii) if said second telephony device is placed in an off-hook state within a predefined time period, reestablishing said connection and ending said connection if said predefine time period is exceeded before said second telephony device is place in an off-hook condition.

2. The method of claim 1 wherein said indication in step (ii) is a predefined Flash sequence.

3. The method of claim 1 wherein said notice in step (iii) is a repeating predefined voice message.

4. The method of claim 1 wherein said notice in step (iii) is a stuttered dial town.

5. The method of claim 1 wherein the signal in step (v) is transmitted in-band between said first switch and said second switch.

6. A method for managing a connection between two telephony devices, comprising the steps of:
(i) a user at a first of said two telephony devices indicating to a first switch to which the first of said two telephony devices is connected to implement a Smart Hold for the connection;
(ii) said first switch indicating to said second telephony device that a Smart Hold will be implemented for said connection;
(iii) said first switch acquiring reconnection information from said second switch;
(iv) ending said connection between said first and second telephony device;
(v) said second switch indicating that said second telephony device is off-hook to any incoming call not originating from said first telephony device;
(vi) said first switch monitoring said first telephony device to determine when it is desired to reconnect to said second telephony device;
(vii) upon determining that it is desired to reconnect, said first switch notifying a user of said second telephony device that it is desired to reestablish a connection; and
(viii) upon said second user confirming that a connection is to be reestablished, reestablishing a connection in accordance with said reconnection information.

7. The method of claim 6 wherein said reconnection information is maintained in a Hold Applet and said Hold Applet performs said monitoring in step (v).

8. The method of claim 6 wherein said reconnection information is a subset of Caller ID information sent from said second switch to said first switch.

9. The method of claim 6 wherein said reconnection information is input by a user at said second telephony device and can specify a different second telephony device.

10. The method of claim 7 wherein said Hold Applet also operates to provide necessary outputs to first switch the first switch.

11. A switch apparatus for a switched telephone network for implementing a doubly terminated hold between a first and a second user, comprising:
means for receiving a request for a Smart Hold from said second user on hold;
means for terminating an existing connection to said first user within said switch apparatus to obtain a doubly terminated connection;
means to advise said first user that said connection has been doubly terminated;
means to receive a reconnect request from said first user;
means to indicate that said second user is off hook to any incoming call not originating from said first user;
means to advise said second user of the receipt of a reconnection request; and
means to monitor said second user and to reconnect said first user and said second user upon an confirmation to do so being received by said switch apparatus within a predefined time period and to end said connection if said confirmation is not received within said time period.

12. A telecommunication system comprising:
a plurality of user telephony devices;
at least two switches operable to create connections between said users, said switches operable to:
(i) terminate a connection to place the connection on hold in response to a request by a first connected user;
(ii) receive a request from a second connected user to implement a Smart Hold and to terminate said connection to achieve said Smart Hold;
(iii) advise said first connected user that said connection has been placed on Smart Hold;
(iv) receive a request from said first user to reconnect to said second user;
(v) indicate said second user is off hook to any incoming call not originating from said first user;
(vi) advice said second user that a reconnection request has been received from said first user; and
(vii) reconnect said first and second user if said first user agrees within a predefined time period or end said connection if said predefined time period is exceeded before said agreement is received from said first user.

13. A method for managing a connection between two users, comprising the steps of:
(i) a user at a first telephony device indicating to a first switch to which said telephony device is connected to terminate the connection in said first switch to place the connection on hold;
(ii) a user at a second telephony devices indicating to a second switch a third telephony device where a reconnection is desired;
(iii) said second telephony device implementing a doubly-terminated connection in said second switch and said second switch terminating said connection;
(iv) sending a notice from said second switch to said user at said first switch indicating that said connection was placed into a doubly-terminated condition;
(v) said second switch indicating that said third telephony device is off-hook to any incoming call not originating from said first of said two telephony devices;
(vi) monitoring at said second switch to detect a signal from said user at said first switch indicating a desire to reestablish said connection;
(vii) said second switch notifying said user at said third telephony device that it is desired to reestablish said connection;
(viii) if said third telephony device is placed in an off-hook state within a predefined time period, reestablishing said connection and ending said connection if said predefine time period is exceeded before said third telephony device is place in an off-hook condition.

* * * * *